United States Patent
Sisodia et al.

(10) Patent No.: US 6,312,129 B1
(45) Date of Patent: *Nov. 6, 2001

(54) HEAD MOUNTED PROJECTOR SYSTEM

(75) Inventors: Ashok Sisodia, Herndon, VA (US);
Roger E. Yaffe, Lake Oswego, OR (US)

(73) Assignee: L-3 Communications Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,923
(22) Filed: Jul. 21, 1998
(51) Int. Cl.[7] .................................................. G03B 21/14
(52) U.S. Cl. ................................ 353/31; 359/618; 345/8; 345/9
(58) Field of Search ............................ 353/30, 28, 13, 353/121, 122; 345/7, 8, 9; 359/618, 630, 627, 629, 637, 638; 385/43, 116, 119, 121, 122, 901

(56) References Cited

U.S. PATENT DOCUMENTS

| | | | |
|---|---|---|---|
| 5,526,184 | * 6/1996 | Tokuhashi et al. | 359/630 |
| 5,596,339 | * 1/1997 | Furness, III et al. | 359/630 |
| 5,606,458 | * 2/1997 | Fergason | 359/630 |
| 5,680,257 | * 10/1997 | Anderson | 385/43 |
| 5,808,589 | * 9/1998 | Fergason | 345/8 |
| 5,886,822 | * 3/1999 | Spitzer | 359/630 |

* cited by examiner

*Primary Examiner*—William Dowling
(74) *Attorney, Agent, or Firm*—Andrew L. Tiajoloff

(57) ABSTRACT

A head mounted projection unit (16) and system (30) is disclosed. The unit includes a tapered optical relay that allows the use of a simple optical projection system. The unit further includes structure for allowing the transmission of images having both low resolution portions and high resolution portions.

17 Claims, 3 Drawing Sheets

HEAD MOUNTED PROJECTOR SYSTEM

BACKGROUND OF THE INVENTION (a) Field of the Invention

The present invention relates in general to image projection systems. More particularly it relates to a head mounted image projection system that is compact, simple and easily implemented.

(b) Description of Related Art

A variety of image projection systems are known in the art. In general, such systems use a variety of lens and other optics to project a relatively small conventional screen image onto a substantially larger screen. One of the best known examples of this type of system is projection television.

Head mounted image projection systems are particularly advantageous. They are often used in virtual reality systems for entertainment and non-entertainment applications (e.g., training and simulation). A typical flight simulation system includes a computer that executes software programs that create the flight simulation images. These images are coupled via a video cable to floor-mounted light value projectors, which in turn feed the image to fiber optic image guides. The fiber optic image guides couple the image to an optics configuration mounted on a helmet or other headgear. The user places the headgear on his/her head, and the optics configuration projects the image onto a screen located in front of the user. Alternatively, the user may view a magnified virtual image by using a simple magnifier or an eyepiece, as used in microscopes and telescopes (one such system is available under the trademark "Fiber-Optic Helmet Mounted Display" and is marketed by CAE Electronics Ltd. Of Saint-Laurent Quebec, Canada). Other projection systems are disclosed in U.S. Pat. Nos. 4,347,508; 4,922,550; 5,416,876; 4,439,157; and 5,319,490.

The above-described systems have several shortcomings. For example, the floor mounted projector is large, consumes several kW of power, relatively immobile and expensive. The fiber optic image guide, when provided in sufficient length to provide the user with some mobility, can be cumbersome, lossy in terms of luminance and resolution, expensive and relatively heavy. The optics configuration can become extremely complicated, large and expensive depending on the size of the projected image and the desired image resolution which is defined as the smallest discernible or measurable detail in the image. The excessive weight on the head can be a significant deviation from the operational environment being simulated.

Accordingly, there is a need for a head mounted image projection system that is compact, lightweight, inexpensive and relatively easy to design and maintain.

SUMMARY OF THE INVENTION

The present invention is embodied in a head mounted projection systems that has several advantages over known head mounted projection systems. In particular, the present invention provides an image projection system that is compact, lightweight, inexpensive and relatively easy to design and maintain.

An apparatus embodying the present invention includes a head-mount unit capable of being mounted to a headgear for use in connection with a head mount projection system. The head-mount unit includes a first image source, a first tapered relay that receives an image output from said first image source, and an optics system that relays an image output from said first tapered relay to a screen.

In an alternative embodiment, the above-described unit further includes a second image source, and a second tapered relay that receives an image output from said second image source, wherein the optics system relays an image output from the second tapered relay to the screen. The image output from the first image source is larger than the image output from said first tapered relay, the image output from the second image source is larger than the image output from the second tapered relay, and the image output from the first tapered relay is larger than the image output from the second tapered relay. The image output from the first tapered relay has a lower resolution than the image output from the second tapered relay. Alternatively, the image output from the first tapered relay can have a higher resolution than the image output from the second tapered relay.

The present invention may also be embodied in a head mount projection system having an image generator coupled to a head-mount unit mounted to a headgear. The image generator generates a primary image that is provided to the head-mount unit. The head-mount unit includes a first image source that receives at least a portion of the primary image, a first tapered relay that receives an image output from the first image source, and an optics system that relays an image output from the first tapered relay to a screen.

In an alternative embodiment, the above-described head-mount unit further includes a second image source that receives at least a portion of the primary image, and a second tapered relay that receives an image output from the second image source, wherein the optics system relays an image output from the second tapered relay to the screen. The image output from the first image source can be larger than the image output from the first tapered relay. The image output from the second image source can be larger than the image output from the second tapered relay, and the image output from the first tapered relay can be larger than the image output from the second tapered relay. The image output from the first tapered relay can have a higher resolution than the image output from the second tapered relay. Alternatively, the image output from the first tapered relay can have a lower resolution than the image output from the second tapered relay.

The present invention may also be embodied in a method of projecting a primary image onto a screen using a head mount projection system. The steps of the method include generating a primary image, providing the primary image to a head mounted unit having a first tapered fiber optic relay and an optics system, reducing at least a portion of the primary image using the first tapered fiber optic relay, and relaying the reduced primary image to a screen using the optics system.

In an alternative embodiment of the above-described method, the head mounted unit further includes a second tapered fiber optic relay, and the second tapered fiber optic relay is used to reduce at least a portion of the primary image. The optics system relays an image output from the second tapered relay to the screen. The primary image can be larger than the image output from the first tapered relay. The primary image can be larger than the image output from the second tapered relay. The image output from the first tapered relay could be larger than the image output from the second tapered relay. The image output from the first tapered relay can have a higher resolution than the image output from the second tapered relay. Alternatively, the image output from the first tapered relay can have a lower resolution than the image output from the second tapered relay.

The invention itself, together with further objects and attendant advantages, will best be understood by reference

DESCRIPTION OF THE PREFERRED EMBODIMENTS

By the way of example only, the device and method of the present invention will be described below in connection with a particular example in which the image projection application is a flight simulation system. It should be understood, however, that the present invention may be used in connection with a wide variety of image projection applications beyond the detailed example disclosed.

Figure 1:
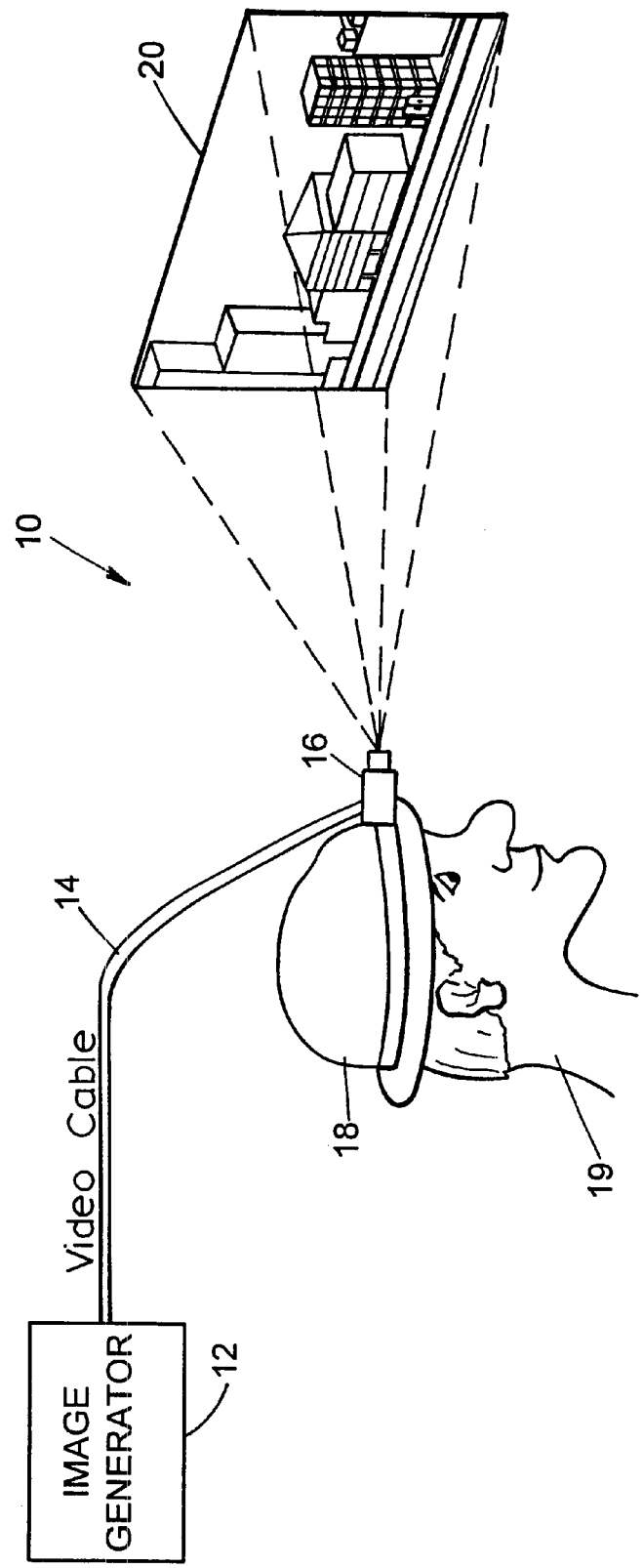
FIG. 1 is a diagram illustrating a head mounted projection system embodying the present invention.

Turning now to a more detailed description of the present invention, FIG. 1 is a diagram illustrating a head mounted projection system 10 embodying the present invention. As shown, the projection system 10 includes an image generator 12, a video cable 14, a head-mounted unit 16, headgear 18, and a screen 20. The image generator 12 can take a variety of forms. For flight simulator applications, the image generator 12 is a computer programmed with known software that generate images that simulate what a pilot would see during flight. The image generator 12 provides a primary image 44 (shown in FIG. 3a) directly to the head-mount unit 16 via the video cable 14. The head-mount unit 16 uses a novel configuration (illustrated in more detail in FIG. 2) that projects the primary image on the screen 20.

Figure 2:
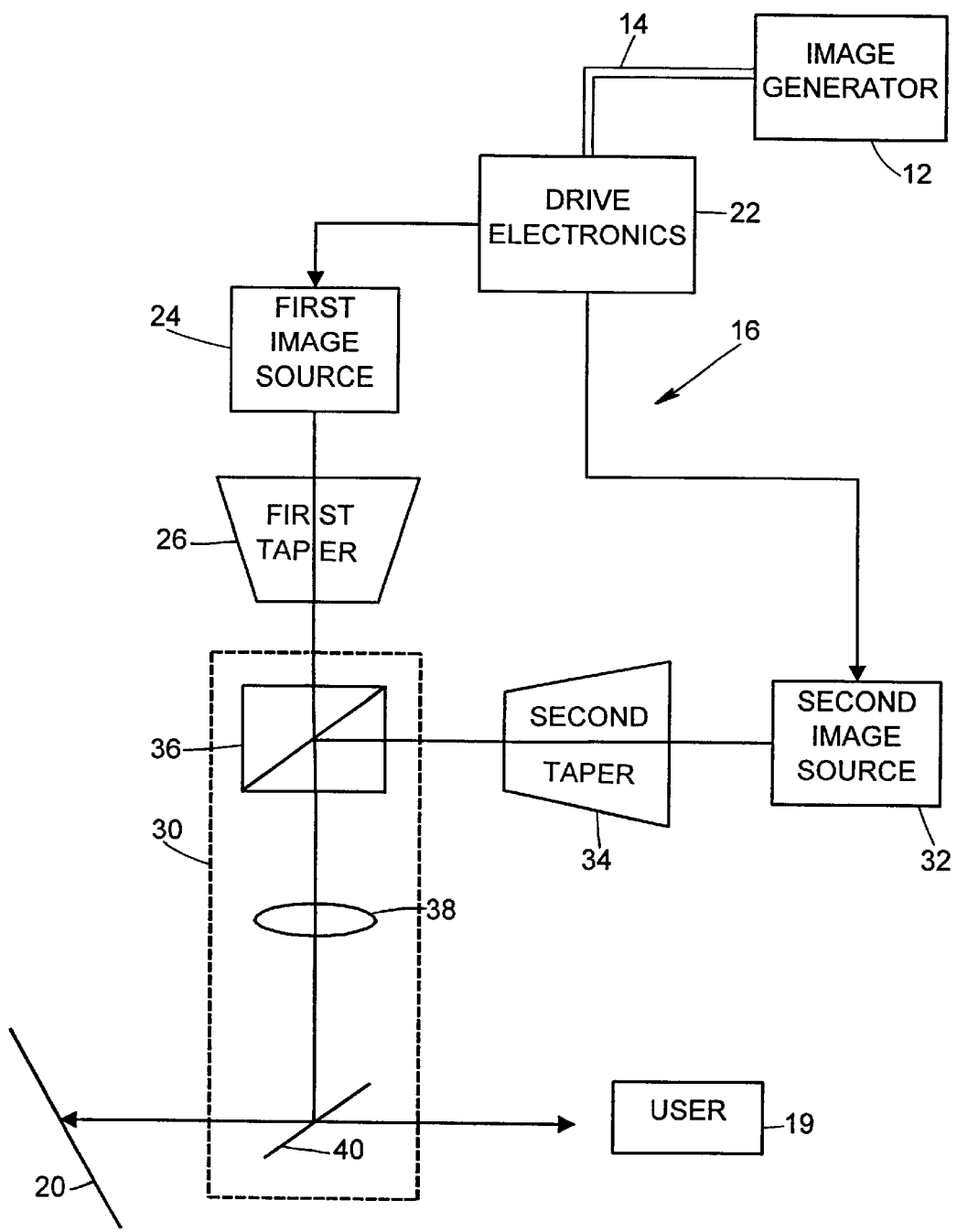
FIG. 2 is a block diagram that illustrates additional details of the head-mount unit shown in FIG. 1.

FIG. 2 illustrates additional details about the system 10 shown in FIG. 1, particularly the head-mount unit 16. As illustrated, the head-mount unit 16 includes drive electronics 22, a first image source 24, a first tapered fiber optic relay 26, an optics system 30, a second image source 32, and a second tapered fiber optic relay 34. The optics system 30 includes a beam splitter 36, a lens 38 and a fold mirror 40.

Figure 3A:
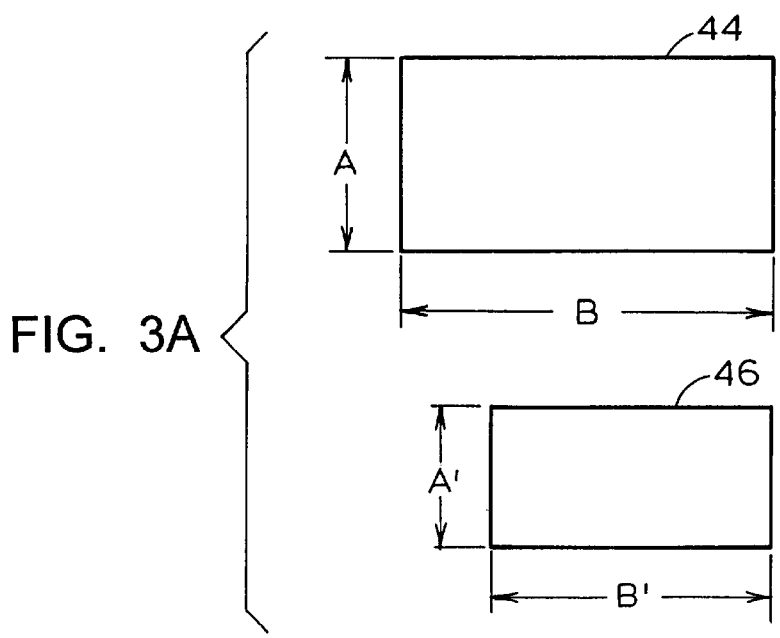
FIG. 3a illustrates an input image and an output image for the tapered fiber optic relay shown in FIG. 2.

In operation, the image generator 12 generates a primary image 44 (shown in FIG. 3a). The image generator 12 may output images on a low resolution channel and a high resolution channel. If the primary image has relatively static and non-detailed portions (e.g., background), along with more detailed portions (e.g., foreground action images), the image generator 12 can divide the image and send the background images to the low resolution channel and the foreground images to the high resolution channel. The primary image is fed from the image generator 12 to the head mount unit 16 via a conventional video cable 14.

The cable 14 feeds the image through drive electronics 22 to the first image source 24 and the second image source 32. If the image generator 12 divided the primary image such that one portion of the image is on the low resolution channel and another portion of the image is on the high resolution, the low resolution portion is provided to the first image source 24 and the high resolution portion is provided to the second image source 32. The first and second image sources 24, 32 may each be a conventional device that generates an image on a display. Preferably, the image sources 24, 32 are miniature flat panel displays (FPDs) such as active matrix liquid crystal, field emission, electroluminescent or plasma displays.

The tapered fiber optic relays 26, 34 are placed in contact with the front of the image sources 24, 32 such that the primary image is passed through the tapered relays. The tapered relays 26, 34 are each tapered downstream such that their output images are smaller than their input images. The output from the tapered relays 26, 34 is reduced to a small enough size that it can be matched with the format of a simple and inexpensive projection lens system 30. If the primary image was divided, the output end of the first tapered fiber optic taper 26 is larger than the output end of the second tapered fiber optic taper 34. Reducing the primary image (for e.g., by ½ at taper 26, and by ¾ at taper 34) increases the angle of the light coming out of the tapered fiber optic relays 26, 34 so that not only does the image fill the format of the projection lens system 30, but the projected image is also completely and uniformly filled with light. Accordingly, when the person 19 wearing the headgear 18 looks at the image reflected off of the screen 20, they do not see a bright central region and a region that is dimmer. The image is completely illuminated, and artifacts are generally limited to exterior influences such as moving the head mounted projection unit 16 away from the user's eye.

The images output from the relays 26, 34 are applied to the projection lens system 30. The projection lens system 30 includes the beam splitter 36, the relay lens 38 and the partially reflective fold mirror 40. The primary optical path is through the first image source 24 and the first tapered fiber optic relay 26. The beam splitter 36 passes the reduced image output from the first tapered fiber optic relay 26 to the relay lens 38 essentially unchanged. The relay lens 38 projects the image to the partially reflective fold mirror 40 which reflects the image/light to the screen 20 (shown in FIG. 1). The image is reflected off the screen 20 back through the partially reflective fold mirror 40 to the user 19.

The secondary optical path is through the second image source 32 and the second tapered fiber optic relay 34. The beam splitter 36 inserts the reduced image output from the second tapered fiber optic relay 34 into the image path of the reduced image output from the first tapered fiber optic relay 26, thereby combining the two reduced images. Thus, the low resolution portion that was provided to the first image source 24 is combined with the high resolution portion that was provided to the second image source 32. The beam splitter 36 passes the reduced image output from the second tapered fiber optic relay 34 to the relay lens 38. The relay lens 38 projects the image to the partially reflective fold mirror 40 which reflects the image/light to the screen 20 (shown in FIG. 1). The image is reflected off the screen 20 back through the partially reflective fold mirror 40 to the user 19.

Figure 3B:
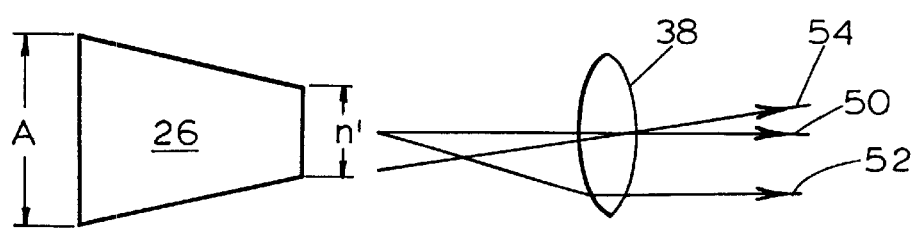
FIG. 3b illustrates more details about the relationship between the tapered fiber optic relay and the relay lens shown in FIG. 2.

Turning now to FIGS. 3a and 3b, FIG. 3a illustrates a primary image 44, and FIG. 3b illustrates a reduced version of the primary image 46. In general, the primary image 44, having dimensions A×B, requires de-magnification to the dimensions A'×B' of the reduced primary image 46 in order to match the wide angle lens format of the lens 38. If the input to the wide angle lens 38 has a cone of light (or field of view) that is too small, then the lens pupil is not fully filled and the resulting image is seen to wander about in opposite direction to the viewer's eye motion. If the input to the wide angle lens 38 has a cone of light (or field of view) that is too large, then the lens pupil is over-filled and the resulting image is cropped and dimmed.

The head mount projection unit 16 embodying the present invention has the advantage of allowing the primary image to be de-magnified while also substantially filling the wide angle lens pupil. Thus, the primary image 44 has a primary format (or size). When the primary image 44 is passed through the fiber optic taper 26, the format is reduced resulting in the reduced primary image 46. Thus, the dimension A is larger than the corresponding dimension A', and the dimension B is larger than the corresponding dimension B'. Referring to both FIG. 3a and FIG. 3b, the dimension A of the primary image 44 corresponds to the height at the input end of the first taper 26, and the dimension A' of the reduced image 46 corresponds to the height at the output end of the first taper 26.

FIG. 3b illustrates a side view of the first fiber optic taper 26 and the relay lens 38. Exemplary light rays 50, 52, 54 are shown exiting the tapered relay 26. The three rays 50, 52, 54 represent generally the light rays from three points on the reduced image 46. The lens 38 relays the light rays 50, 52, 54 onto the screen 20 (via mirror 40).

The output from the first taper 26 is matched to the relay lens 38. The lens 38 has a specific field of view (FOV), and this FOV projects an image having a specific geometric size. If the output from the taper 26 is bigger than the geometric size of the lens format, then the entire image will not fit in the lens 38. If the output from the taper 26 is smaller than the geometric size of the lens format, then the entire image will not fill the full lens 38. Thus, the vertical dimension of the output from the taper 26 matches the vertical dimension of the lens 38. Thereby, substantially all of the light that is coming out of first taper 26 is being captured and relayed by the lens 38. Additionally, the taper surface facing the lens 38 can be ground and polished to a shape required by the optical design of the lens 38. The lens 38 is also matched to the size of the screen 20. For flight simulation applications, the FOV is chosen to as wide as possible, preferably up to 100 degrees.

Accordingly, it can be seen from the foregoing detailed description that the invention provides several advantages. The invention simplifies the head mounted unit by eliminating the need for heavy and expensive floor mounted projection units, heavy and expensive elongated fiber optic image guides, and expensive and potentially complicated optical focusing configurations. The present invention uses a taper to de-magnify the image, thereby allowing it to be matched to a simple and inexpensive optical projection system. The novel configuration further allows the primary image to the divided into a low resolution portion and a high resolution portion.

Of course, it should be understood that a range of changes and modifications can be made to the preferred embodiment described above. For example, the optical projection system 30 may take a variety of forms. The drive electronics 22 may be implemented as one circuit or two separate circuits for the low resolution channel and the high resolution channel, respectively. The drive electronics 22 may or may not be incorporated into the head mounted unit. The tapers 26, 34 may be optical relays other than optical fiber. It is therefore intended that the foregoing detailed description be regarded as illustrative rather than limiting and that it be understood that it is the following claims, including all equivalents, which are intended to define the scope of this invention.

What is claimed is:

1. A projection system comprising:
   an image generation system;
   a head-mount unit adapted to be supported on a head of a user;
   a projection screen separate from the head mount unit against which images can be projected for viewing by the user;
   said head-mount unit comprising:
   first and second image sources each being connected with the image generation system and each receiving therefrom at least a respective image or portion of an image to display, each of the image sources generating a respective image output responsive thereto;
   first and second relays each associated with a respective image source, the first relay receiving and relaying the image output from said first image source to produce a first relayed image output, and the second relay receiving and relaying the image output from said second image source to produce a second relayed image output;
   the first relayed image output being smaller than the image output from the first image source and smaller and in higher resolution than the second relayed image output;
   an optics system receiving and combining the first and second relayed image outputs, and projecting the first and second relayed image outputs to the screen together so that the first relayed image output is viewed by the user in higher resolution than, and together with, the second relayed image output.

2. The projection system of claim 1, and
the second relayed image output being smaller than the image output from the second image source.

3. The projection system of claim 1, and
said relays being tapered relays reducing the size of images transmitted therethrough.

4. The projection system of claim 1, and
said relays each comprising a tapered fiber optic relay.

5. The projection system of claim 1, and
the image generator generating a primary image and separating said primary image into a low resolution channel image and a high resolution channel image, said high resolution channel image being sent to the first image source and said low resolution channel image being sent to the second image source.

6. The projection system of claim 1, and
each image source comprising a flat panel crystal display.

7. The projection system of claim 1, and
each image source comprising a miniature flat panel crystal display.

8. The projection system of claim 1, and
the head mount unit being part of headgear adapted to be worn on the head of the user.

9. The projection system of claim 1, and
said optics system comprising a beamsplitter to which the relayed image outputs are transmitted so that one relayed image is reflected therefrom and one relayed image passes therethrough so that said images are combined on the same image path.

10. The projection system of claim 1, and
said optics system comprising a fold mirror which reflects the combined relayed output images to project on the screen.

11. The projection system of claim 10, and
said fold mirror being formed of a partially reflective material.

12. The projection system of claim 11, and
said optics system including a lens causing the light of the relayed images to project conically for projection on the screen.

13. The projection system of claim 1, and the lens having a dimension thereacross, and the first and second relayed image outputs being smaller than the dimension.

14. The projection system of claim 1, and said optics system comprising combining means receiving the relayed image outputs and combining said relayed image output to be in the same image path;

a convex lens structure receiving the combined image and causing the light thereof to project conically for projection; and a fold mirror reflecting the conically projecting light to the screen.

15. A method of projecting an image using a head mount projection system, said method comprising:

generating first and second images each representing part of the image to be projected;

providing said first and second images to a head mounted unit having first and second tapered fiber optic relays;

reducing at least a portion of said primary image using each of said tapered fiber optic relays to produce first and second relayed image outputs, one of the outputs having a higher resolution than the other;

combining the high and low resolution relayed image outputs with and optics system;

projecting said combined image outputs together onto a screen separate from the head mounted unit using said optics system to display the image to the user.

16. The method of claim 15 and said image output from said first tapered relay being smaller than said image output from said second tapered relay.

17. The method of claim 16 wherein said image output from said first tapered relay has a higher resolution than said image output from said second tapered relay.

\* \* \* \* \*